July 7, 1970  P. NASH ET AL  3,519,922
APPARATUS FOR DETECTING ABRUPT CHANGE IN THE
THICKNESS OF SHEET MATERIAL
Filed Dec. 5, 1966  4 Sheets-Sheet 1
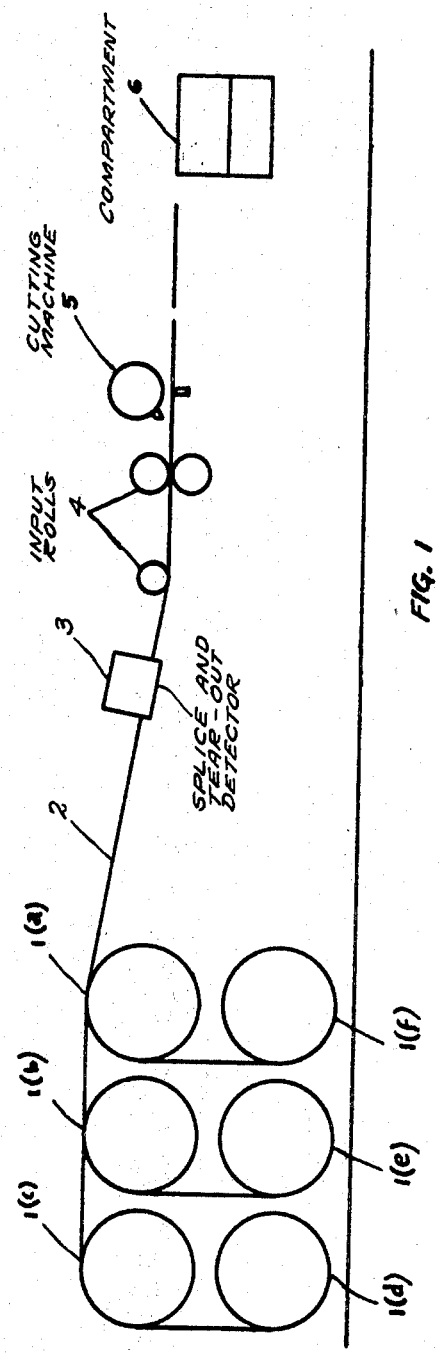
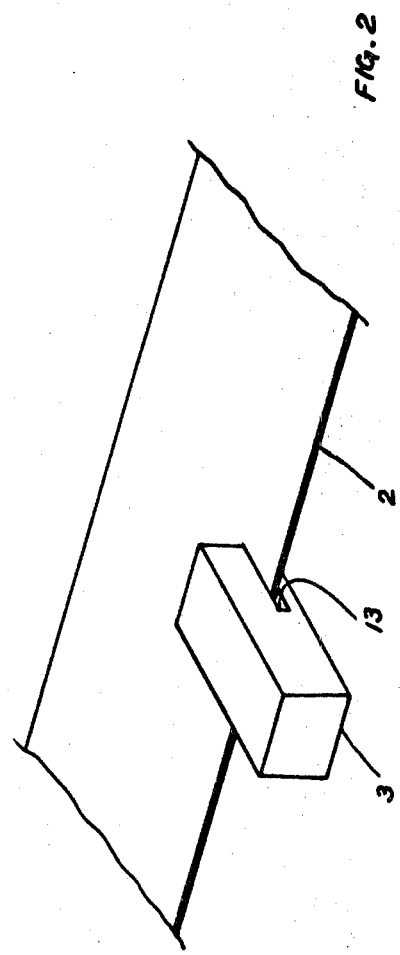
PAUL NASH
G. BRIAN HICK - Inventors
Moore & Hall - Attorneys PAUL NASH
G. BRIAN HICK - Inventors Moore & Hall - Attorneys

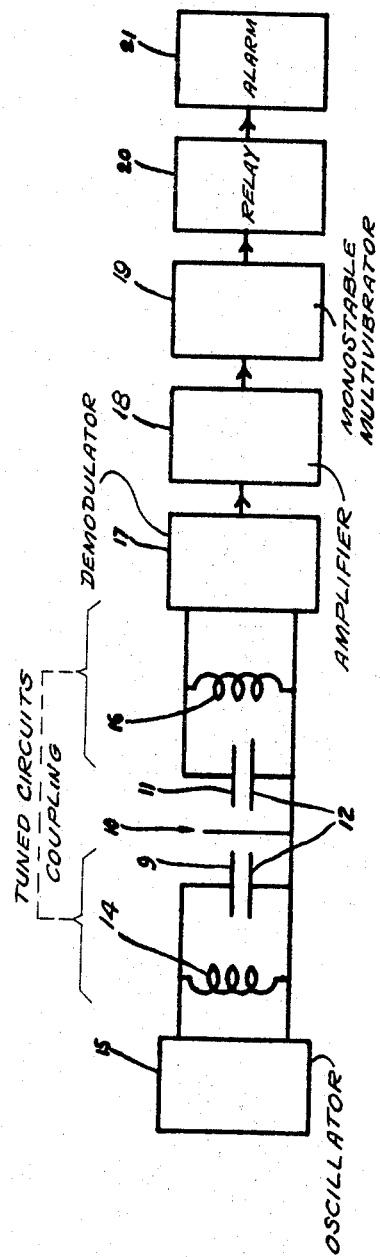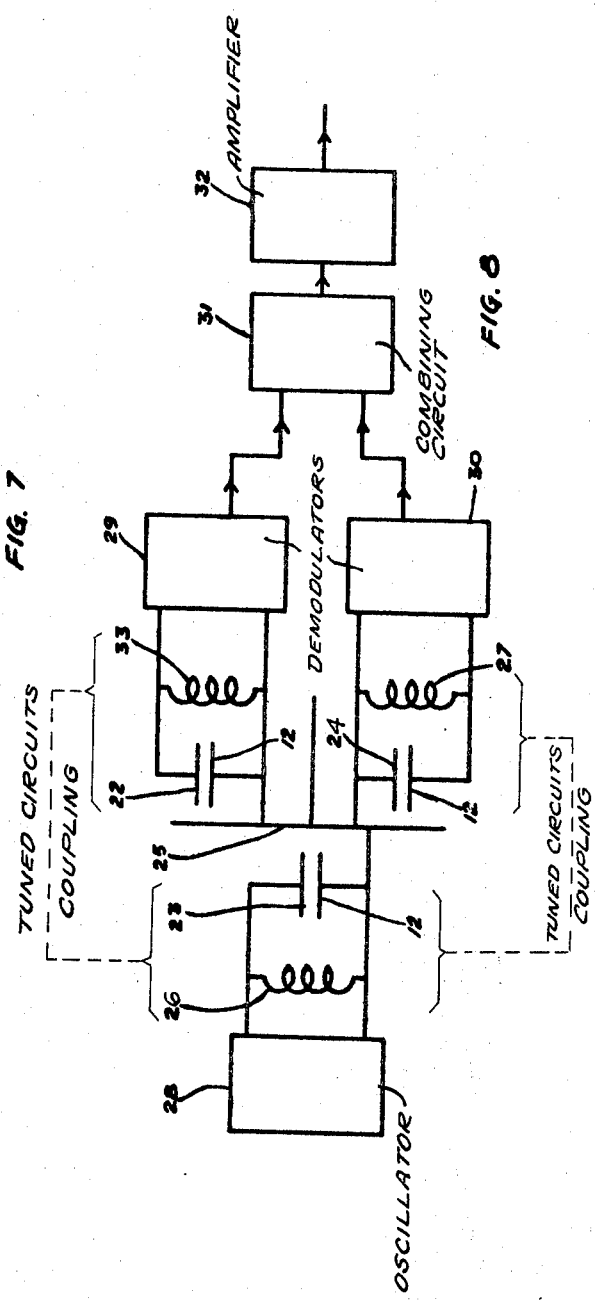

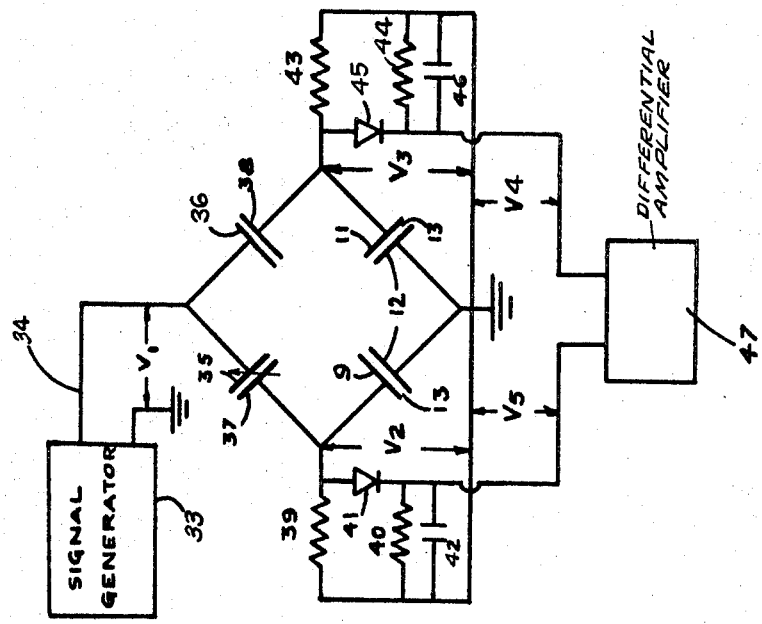
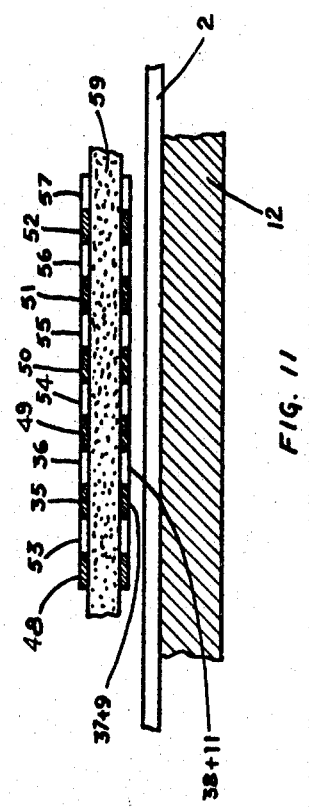
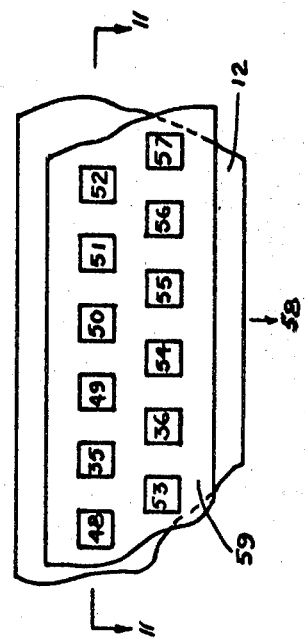
PAUL NASH
G. BRIAN HICK - Inventors

United States Patent Office 3,519,922
Patented July 7, 1970

3,519,922
APPARATUS FOR DETECTING ABRUPT CHANGE IN THE THICKNESS OF SHEET MATERIAL
Paul Nash and Gordon Brian Hick, Ottawa, Ontario, Canada, assignors to Nash and Harrison Limited, Ottawa, Ontario, Canada
Filed Dec. 5, 1966, Ser. No. 599,090
Claims priority, application Canada, Dec. 16, 1965, 947,962
Int. Cl. G01r 27/26; G08b 21/00; D21f 7/06
U.S. Cl. 324—61
4 Claims

ABSTRACT OF THE DISCLOSURE

The detection of abrupt changes in thickness of moving sheet material. The sheet material is fed between the plates of two spaced, substantially identical, capacitors and thereby constitutes part of the dielectric between the plates. An abrupt change of thickness in the material passing between the plates of one of the capacitors is sensed as a change of capacitance of that capacitor and this difference is utilized to indicate the presence of the defect causing the change in capacitance.

---

This invention relates to a device for the detection of splices and missing portions in moving sheet materials and, in particular, paper or other similar products.

During the manufacture of paper and similar materials, due to various production and handling problems, it is often necessary to splice the paper in order to maintain a continuous running sheet. This results in the production of rolls of paper in which the occurrence of one or more splices is not uncommon. Also, for various reasons, pieces become torn from the edges of the paper from time to time (known in the art as "tear-outs").

The existence of these defects in rolls (i.e., splices and tear-outs) is not a great problem as long as their whereabouts is known; however, they are difficult to locate when the paper is in roll form, unless such defective sections are clearly flagged.

Later in the finishing process it is quite common to cut these rolls of paper into sheets on a machine designed for this purpose and which is usually capable of cutting several thicknesses, i.e., several rolls at one time. This process, known in the art as "multi-roll sheeting" may involve the simultaneous unwinding and cutting of as many as eight or more rolls, depending on the capability of the cutter. Clearly, the aforementioned splices and tear-outs are not usually visible to the operator of such a machine and, even with constant vigilance, watching for the aforementioned flags in the rolls, his reliable detection of them is difficult. Should splices and tear-outs remain undetected in multi-roll sheeting, such defects can cause breakdowns on the printing machines.

While the primary requirement for the detection of splices and tear-outs is actually a measurement of the combined thickness of the several webs of paper, many pitfalls are inherent in the making of such measurements. The most common problem is that of accommodating various numbers of sheets in multi-roll sheeting. Furthermore, the thickness of the sheets may vary from time to time (known in the art as "caliper variation"). Such normal variation within tolerance must be ignored by the detector. Further, the density and colour of the paper must not affect the operation of the detector, nor should variations in these parameters such as might occur gradually at different places within any given roll of paper. Prior art discloses methods of detection which require adjustments or other operator attention in order to compensate for changes in the variables mentioned above.

According to the present invention, all splices and tear-outs are reliably detected, and no adjustments or changes are necessary to accommodate changes in the nature of the material (i.e., colour, caliper, density) or numbers of sheets being inspected.

According to the present invention, the detection of splices and missing portions in moving sheet materials having substantially uniform characteristics is carried out by means of at least two capacitors spaced with respect to each other in directions according to the type of defect to be detected. If the detection of splices is the primary concern, the two capacitors are spaced apart longitudinally of the direction of motion of the moving sheet material, whereas if tear-outs are primarily to be detected, the capacitors are spaced apart transversely to the direction of travel of the moving sheet material. The moving sheets are passed between the two electrodes of each capacitance and when a splice or a tear-out i.e., a sudden change occurs in the combined thickness of the material passing between the capacitors, the capacitance of the one capacitor changes with respect to the other. This capacitance change is indicative of a splice or tear-out in the moving material.

In one aspect of the present invention, the change in capacity detunes a tuned circuit. Thus, one capacitor is included in a first resonant circuit which forms part of an oscillator, and the resonant frequency of this first resonant circuit determines the frequency of operation of the oscillator. The other capacitor is included in a second resonant circuit which is electrically coupled to a detector or demodulator. When the moving sheets passing between the electrodes of the two respective capacitors have essentially identical dielectric characteristics, the two resonant circuits are tuned to the same frequency, and a predetermined amount of energy is then coupled between the oscillator and the demodulator. If, however, because of the characteristics of the moving sheets, the capacitance of one capacitor is changed at any instance so as to be different from that of the other capacitor, then the two resonant circuits will momentarily be resonant at different frequencies, and this will affect the amount of energy transferred from the oscillator to the demodulator, resulting in a distinctive output from the demodulator and its associated circuitry. It should be noted, incidentally, that the two capacitors are electrically isolated from each other by means of an intermediate plate, thereby producing a loose coupling of the two resonant circuits so that a detuning of the second resonant circuit, for example, will not have any discernible effect upon the oscillator output frequency but will instead have a significant effect upon the coupling between the two resonant circuits.

In another aspect of the invention, the detection of the capacitance change is achieved through use of a bridge circuit.

While there is no intent to limit the application of the invention, for simplicity of description the material shall be paper and the application shall be that of detection of splices and tear-outs on a multi-roll paper cutting machine.

Having regard to the foregoing, and other objects and advantages which will become apparent as the description proceeds and the details become known, the invention consists essentially of a detection method and the novel combination and arrangement of parts hereinafter described in detail and illustrated in the drawings, in which:

FIG. 1 is a representative illustration of the splice and tear-out detector, showing a typical arrangement when used in conjunction with a multi-roll paper cutting machine.

FIG. 2 is an enlarged view, showing the location of the splice and tear-out detector of the invention with respect to the material being inspected.

FIG. 7 is a schematic diagram, partly in block form, showing a circuit arrangement in accordance with the invention.

FIG. 8 is a schematic diagram, partly in block form showing a second possible circuit arrangement corresponding to the arrangement shown in FIG. 6.

FIG. 9 is a schematic diagram of another circuit arrangement in accordance with the invention.

FIG. 10 is a plan view of a modified detector for use in the detection of lumps and voids.

FIG. 11 is a cross-sectional view of the detector of FIG. 10 taken along the line 11—11.

Figure 3:
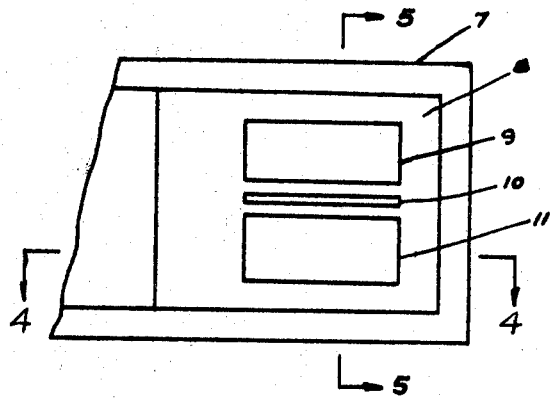
FIG. 3 is a diagrammatic view, partly in section, of the splice and tear-out detector, showing a typical arrangement of parts.

Referring now to the accompanying drawings wherein the present invention is illustrated, and wherein the various numerals indicate the several parts to be described.

In FIG. 1, the numerals 1(a)–1(f) indicate six rolls of paper so arranged that when simultaneously unwound, their combined output 2 flows through the splice and tear-out detector 3, past the input rolls 4, and into the cutting machine 5 where all six webs are cut into sheets and piled in the compartment 6.

FIG. 2 is an enlarged view showing the position of the several thicknesses of paper 2 flowing through a slot 13 in the splice and tear-out detector 3.

Figure 4:
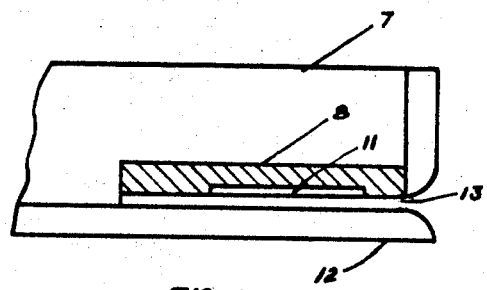
FIG. 4 is a section taken along the line 4—4 in FIG. 3.
Figure 5:
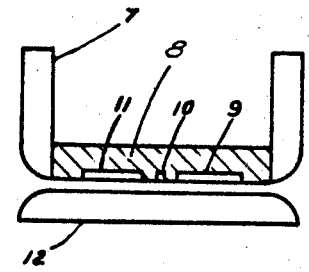
FIG. 5 is a view in cross-section taken along the line 5—5 of FIG. 4.

Structurally, one embodiment of the invention is as shown in FIGS. 3, 4 and 5. FIG. 3 shows a view in plan where the numeral 7 indicates the supporting side plates of the device, to which is mounted a piece of high quality electrical insulating material 8. The numerals 9, 10 and 11 indicate metallic plates, fastened to the insulating member 8 and arranged as shown most clearly in FIG. 5. The whole as described above is rigidly fastened to the metal base 12 in such a manner as to leave a slot 13 through which the paper 2 may pass.

It will be recognized by those skilled in the art that, electrically, this arrangement produces two capacitors, one formed essentially by metal plate 9 and the base 12, and the other formed by the metal plate 11 and the base 12. The metal element 10 is connected electrically to the base 12 and serves as an electrical shield between the active elements 9 and 11.

Referring now to FIG. 7, the two capacitors mentioned above are shown schematically along with other parts as indicated. It will be seen that the capacitor formed by plate 9 and base 12 is connected to a coil 14. This combination determines the output frequency of a variable frequency oscillator circuit 15 shown in block form. The exact electrical configuration of the oscillating circuit may take any of several forms well known in the art. As is also well known in the art, the frequency of operation of such as oscillator is given by the formula:

$$f = \frac{1}{2\pi\sqrt{LC}}$$

where:

$f$=frequency of oscillation in cycles per second.
$L$=inductance (of the coil 14) in henries.
$C$=capacitance (of the capacitor formed by plate 9 and base 12) in farads.

It is seen, therefore, that the frequency of oscillation (assuming that the inducance $L$ of the coil 14 remains constant) is dependent upon the capacitance $C$ of the capacitor.

Further, the capacitance $C$ of a capacitor is defined by several factors which are related such that:

$$C = \frac{AK}{t}$$

where:

$C$=capacitance.
$A$=area of the metallic elements or plates which form the capacitor.
$K$=dielectric constant of the insulating medium which separates the plates.
$t$=the thickness of the dielectric or insulating medium.

It will be seen that if all factors are constant except the dielectric thickness $t$, that the capacitance and hence the output frequency will be related directly to the thickness of the dielectric material, in this case, paper.

The second capacitor, formed by plate 11 and the base 12, along with coil 16 form a resonant receiving circuit. The characteristics of this circuit, being similar to the one just described, are such that the resonant frequency is exactly the same as that of the oscillator 15.

This frequency also varies in such a manner that it too is directly related to the thickness of the dielectric material, in this case, paper.

The metallic element 10 acts as an electrical shield between the two resonant circuits and controls the amount of energy transferred from the oscillator circuit 15 to the demodulator 17 by way of the two coupled resonant circuits. The radio frequency energy so received is then de-modulated or rectified and appears, under static conditions, as a constant direct current voltage at the output of the de-modulator 17.

Since the arrangement of the parts and the nature of the two resonant circuits results in a device of a highly symmetrical nature, it is seen that the output of the de-modulator 17 is independent of the nature or number of thicknesses of the paper 2 in the slot 13. Since the same paper always acts as the dielectric for both capacitors, the resonant frequencies of the two tuned circuits are always identical, and maximum output from the de-modulator is always achieved.

If, however, a splice occurs, i.e., a sudden increase in dielectric thickness, then as it moves through the device it must move under either plate 9 or plate 11 first. Such action results in the de-tuning of one of the resonant circuits relative to the other and a resultant drop in the output of the de-modulator 17. After passage of the splice is complete, both resonant circuits will be once again tuned to the same frequency and the output of the de-modulator 17 will return to normal. It may be seen that a similar action will occur in the event of a sudden decrease in dielectric thickness, i.e., a tear-out.

The signal from the de-modulator 17 is fed to amplifier 18 which may take various configurations well known in the art. This amplified signal is now available to actuate a variety of output devices. In the embodiment shown in FIG. 7, the amplified signal is presented to the input of a monostable multivibrator 19. This will be recognized by those skilled in the art as a circuit capable of accepting an input signal whose duration may vary over a wide range and whose amplitude is greater than a predetermined minimum, and producing an output signal of constant, though adjustable, magnitude and duration. This signal actuates a relay 20 and the whole may be so adjusted as to cause the relay contacts to close for say two seconds regardless of the actual time required for the splice to pass through the detector.

Various alarm arrangements 21 such as bells, horns, etc. may be connected to the relay 20 contacts and used to warn the operator that a splice or tear-out has occurred.

In other arrangements, the output signal from the amplifier 18 may be otherwise processed by methods known in the art, and used to actuate devices such as counters, recorders or automatic rejecting mechanisms.

Figure 6:
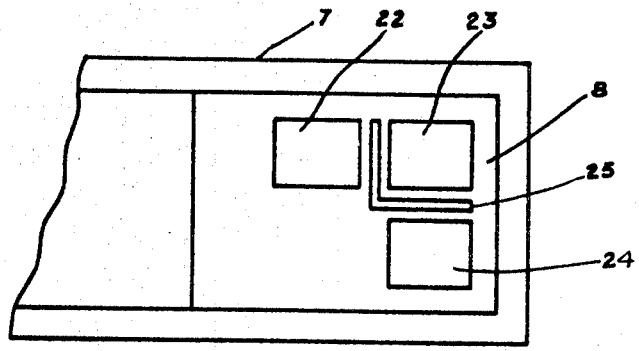
FIG. 6 is a diagrammatic view of a second embodiment of the invention showing another possible arrangement of parts.

Another embodiment of the invention is shown in FIGS. 6 and 8 in which three metallic plates, indicated by the numerals 22, 23 and 24, are placed as shown, along with the shield element 25. In this arrangement, plate 23 with base 12 forms the capacitor in the oscillator circuit 28 and plates 22 and 24 with base 12 forms the two independent receiving circuits each of which is similar to that described in the foregoing, and which are shown schematically in FIG. 8. The two receiving circuits are connected independently to two de-modulators 29 and 30. Under static conditions, since each of the receiving circuits is tuned to the frequency of the oscillator, the output of each de-modulator 29 and 30 is at a maximum. The two de-modulated signals are presented to a combining circuit 31 which, in the event of a change in signal from either de-modulator 29 or 30, passes this signal along to amplifier 32 after which the amplified signal may be processed in any of the several ways already described.

It will be seen that, while preserving the sensitivity for detection of splices, this arrangement is particularly sensitive to tear-outs which have a small angle of approach to the detector. As is seen from FIG. 6, splices, which pass through the detector at right angles, are detected by the de-tuning of the resonant circuit associated with plates 23 and 24. Tear-outs, which have a small angle to the edge of the webs, are detected by the de-tuning of the resonant circuits associated with plates 23 and 22.

Other configurations of plates, resonant circuits, couplings between resonant circuits, and de-modulators are possible in order to make the detector perform as stated above, or to make the detector more sensitive to specific defects.

Turning now to FIG. 9, there is shown an alternative circuit arrangement for use in the present invention.

The output $V_1$ of a signal generator 33 is connected by wire 34 to plates 35 and 36 to two substantially identical capacitors formed by plates 35 and 37 and 36 and 38.

Electrodes 37 and 38 are connected to plates 9 and 11 which in turn form the two sensing capacitors and testgap 13 with plates 12 which are of ground potential.

Therefore, by connecting two external condensers to electrodes 9 and 11 a bridge circuit is formed containing four capacitors. When these four capacitors have identical values, potentials $V_2$ and $V_3$ are in phase and have the same amplitude. These potentials are developed between plate 9 and ground and plate 11 and ground. A rectifier complex, consisting of resistors 39 and 40 rectifier 41 and de-coupling capacitor 42, is connected between plate 9 and ground and an identical rectifier complex, consisting of resistors 43 and 44, rectifier 45 and de-coupling capacitor 46, is connected between plate 11 and ground. The rectified outputs of these rectifier complexes produce two D.C. voltages $V_4$ and $V_5$ which are equal and when connected to the two inputs of a differential amplifier 47 result in zero output.

Now when one of the test capacitors, i.e., 9, 12 or 11, 12, is affected by a change in dielectric substance, potential $V_4$ will not be equal to $V_5$ and the output of the differential amplifier 47 will indicate and be proportional to the change in the dielectric substance. In practice, one of the capacitors formed by electrodes 35, 37 and 36, 38 can be adjusted, so that when the sheet material is uniform and not defective the bridge circuit shown in FIG. 9 is balanced and gives zero output. While the aim is to make the test capacitors formed by plates 9, 12 and 11, 12 identical, small variations can be easily compensated by adjusting the auxiliary capacitors formed by plates 35, 37 and 36, 38.

In FIGS. 10 and 11, a variation of the electrode system of FIG. 1 is shown, which besides detecting splices and tear-outs, also serves for the detection of small changes in the dielectric substance such as small lumps, small holes, fine creases, etc. Metal plate 12 is again placed at ground potential. The sheet material 2, under inspection, forms part of the capacitance between plates (37+9) and 12. In order to assist understanding, this plate is termed (37+9) because the corresponding two plates in FIG. 9 are 37 and 9. That is, this plate (37+9) is common to another capacitance formed with plate 35. Thus, plates 35, (37+9) and 12 form one side of the bridge of FIG. 9 and similarly, plates 36 (38+11) and 12 form the other side of the bridge circuit. The relative positioning of these plates is indicated in FIGS. 10 and 11, though it should be realized that this configuration is one of several possible alternatives.

It should be noted that the plates 48, 49 to 57 form similar bridge circuits. For example, the pair 48, 53 is identical to the function of pair 35 and 36, and so on. The purpose of this arrangement is full coverage of the sheet material. The direction of flow of the sheet material 2 is shown by arrow 58.

As shown in FIGS. 10 and 11, plates 35 and 36 etc. and plates 37+9, 38+11 etc. are suitably deposited onto an insulating sheet 59. One practical method of achieving this is by etching away of sections of a copper-clad Bakelite sheet, clad on both sides with copper. The plate 12 is suitably a solid metal plate and conveniently is the wall of a roller over which the moving sheet material is passed.

In practice, many electrodes of this inspection system would be fed from a single signal generator.

As the plates 35 and 36, 48 . . . 57 are fed from the same source, these plates could be conveniently interconnected by the copper-clad material, i.e., constitute one single plate. Conveniently, the output voltages $V_4$ and $V_5$ etc. would be fed through gating diodes or gating transistors, etc. into one differential amplifier. Also, it should be obvious to those converse in the art that instead of rectifying the A.C. bridge output by two rectifier circuits as shown in FIG. 9, the bridge could be balanced and zeroed for a single central A.C. output by using two more identical impedances, and a single sensing device, which may or may not rectify such output, could be used.

It will be realized that changes may be made in the above and many apparently widely different embodiments may be constructed without departing from the spirit or essential characteristics of the invention.

We claim:
1. Apparatus for detecting abrupt changes in the thickness of a moving sheet of material but being substantially unaffected by long-term thickness variations in the moving sheet, said apparatus comprising:

a plurality of plates positioned along opposite surfaces of said sheet and forming at least two capacitors, said plates being spaced apart and positioned at disparate points in the plane of sheet movement, the plates of said capacitors defining therebetween an aperture through which said sheet material may be passed to thereby affect the capacitances of said capacitors, a plurality of resonant circuits each including a respective one of said capacitors, an electrical oscillator including one of said resonant circuits, the other of said resonant circuits being coupled to said first resonant circuit and being normally energized by energy generated by said oscillator, said resonant circuits being such that when equal thicknesses of said sheet material are present between the plates of said capacitors said resonant circuits are resonant at the same frequency, a demodulating circuit connected to each said other resonant circuit, an amplifying circuit connected to the output of each said demodulating circuit for amplifying changes in the magnitude of the demodulated signal, and a utilization circuit connected to said amplifier circuits, whereby an abrupt change in thickness of said sheet material passing through one of said apertures causes said utilization circuit to provide a distinctive output.

2. An apparatus as claimed in claim 1, in which there are at least three of said capacitors and three said resonant circuits, said electrical oscillator including one of said capacitors and one of said resonant circuits,
- at least two receiving circuits each including a respective one of said capacitors and an associated resonant circuit,
- each said receiving circuit being coupled to said one resonant circuit and being normally energized by said oscillator.

3. An apparatus as claimed in claim 1 wherein said utilization circuit consists of a monostable multivibrator responsive to signals of predetermined magnitude regardless of duration and which produces output signals of constant magnitude and duration, said output signals being suitable for the activation of various alarm devices.

4. An apparatus as claimed in claim 1 wherein the plates forming two of said capacitors are positioned at disparate points along the material length to detect splices and the plates forming another of said capacitors are positioned in combination with the plates of one of said two capacitors at disparate points across the sheet width to detect tear-outs.

References Cited

UNITED STATES PATENTS

| | | | |
|---|---|---|---|
| 1,984,166 | 12/1934 | Walter | 324—61 X |
| 2,222,221 | 11/1940 | Burford | 324—61 |
| 2,542,372 | 2/1951 | Taylor et al. | 324—61 |
| 2,948,850 | 8/1960 | Ederer | 324—61 |
| 3,039,051 | 6/1962 | Locher | 324—61 |
| 3,122,956 | 3/1964 | Jucker | 324—61 X |
| 3,237,098 | 2/1966 | Grignet | 324—61 |
| 1,878,109 | 9/1932 | Clark | 324—61 |
| 2,439,047 | 4/1948 | Grinstead et al. | 324—61 X |
| 3,009,101 | 11/1961 | Locher | 324—61 |

FOREIGN PATENTS

| | | |
|---|---|---|
| 236,230 | 10/1961 | Australia. |
| 797,399 | 7/1958 | Great Britain. |

EDWARD E. KUBASIEWICZ, Primary Examiner

U.S. Cl. X.R.
340—259; 162—263